Dec. 15, 1964 S. A. MENCACCI 3,161,526
METHOD OF AND APPARATUS FOR PROCESSING FISH
Filed March 27, 1961 6 Sheets-Sheet 2
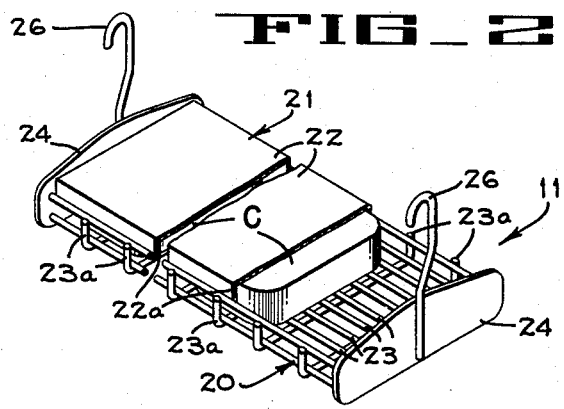
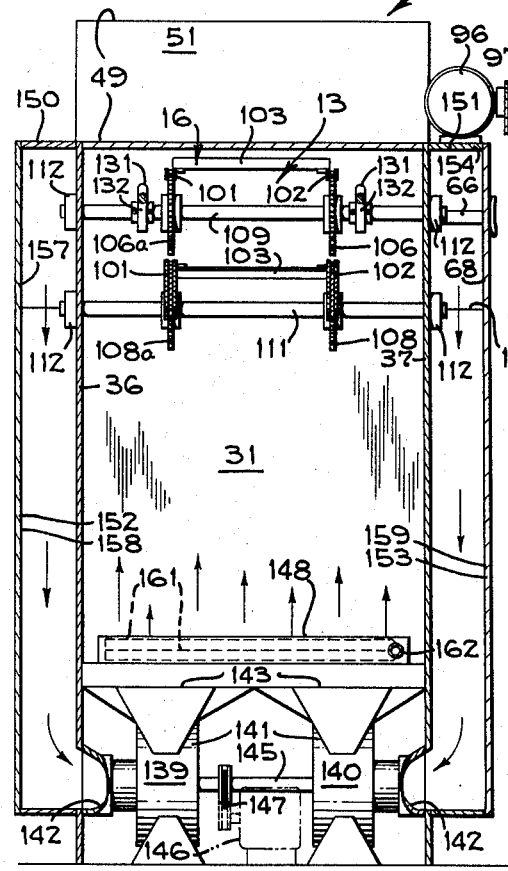
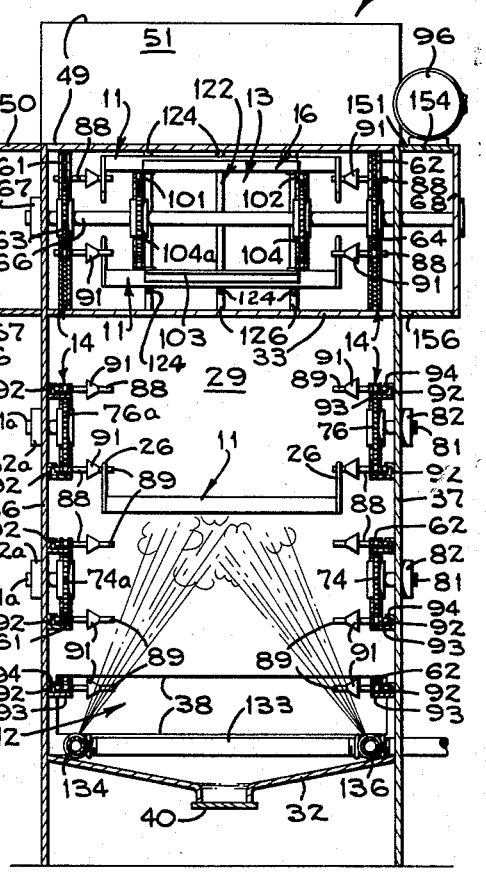
INVENTOR
SAMUEL A. MENCACCI
BY *Hans G. Hoffmeister*
ATTORNEY Dec. 15, 1964  S. A. MENCACCI  3,161,526
METHOD OF AND APPARATUS FOR PROCESSING FISH
Filed March 27, 1961  6 Sheets-Sheet 3
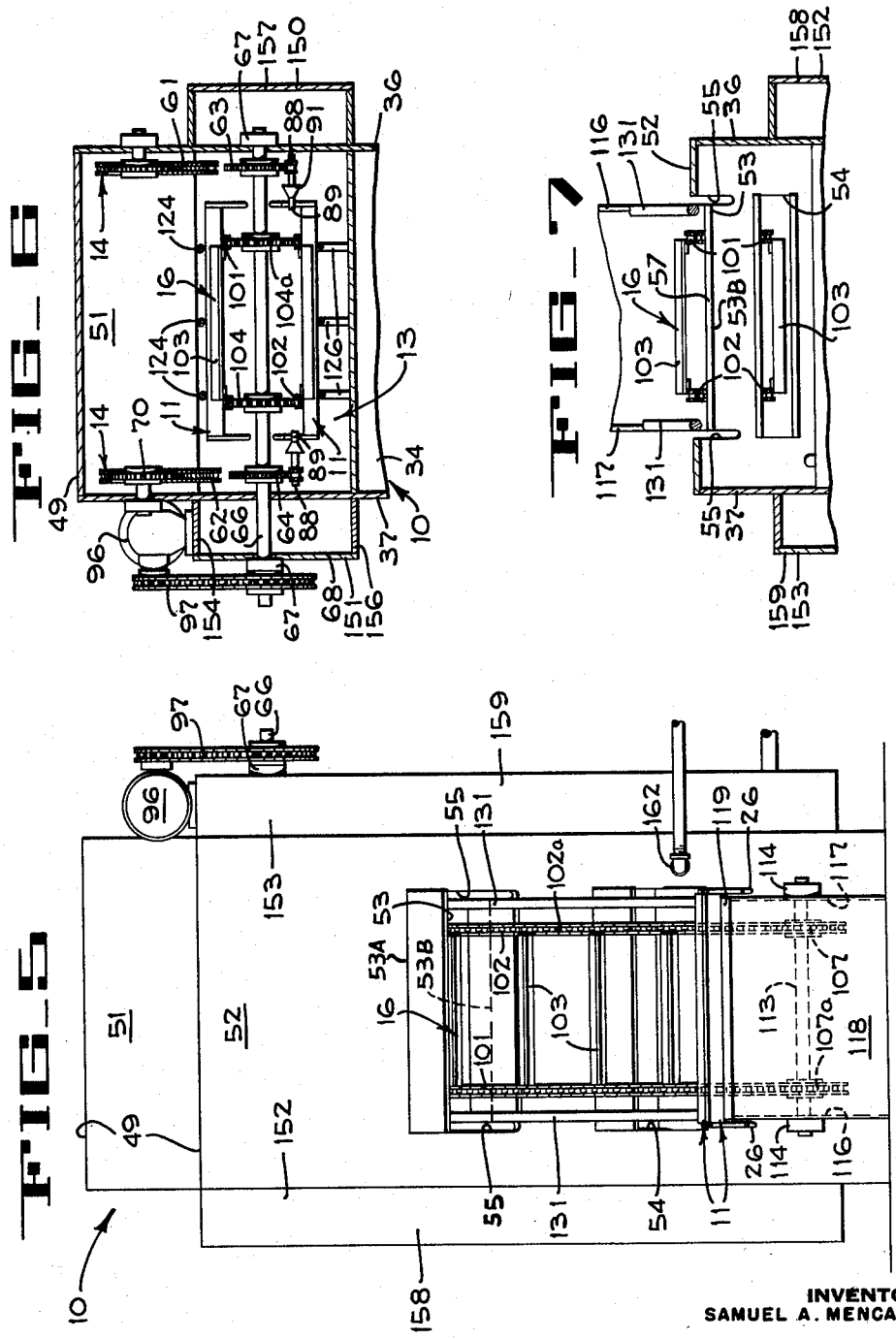
INVENTOR
SAMUEL A. MENCACCI
BY
ATTORNEY

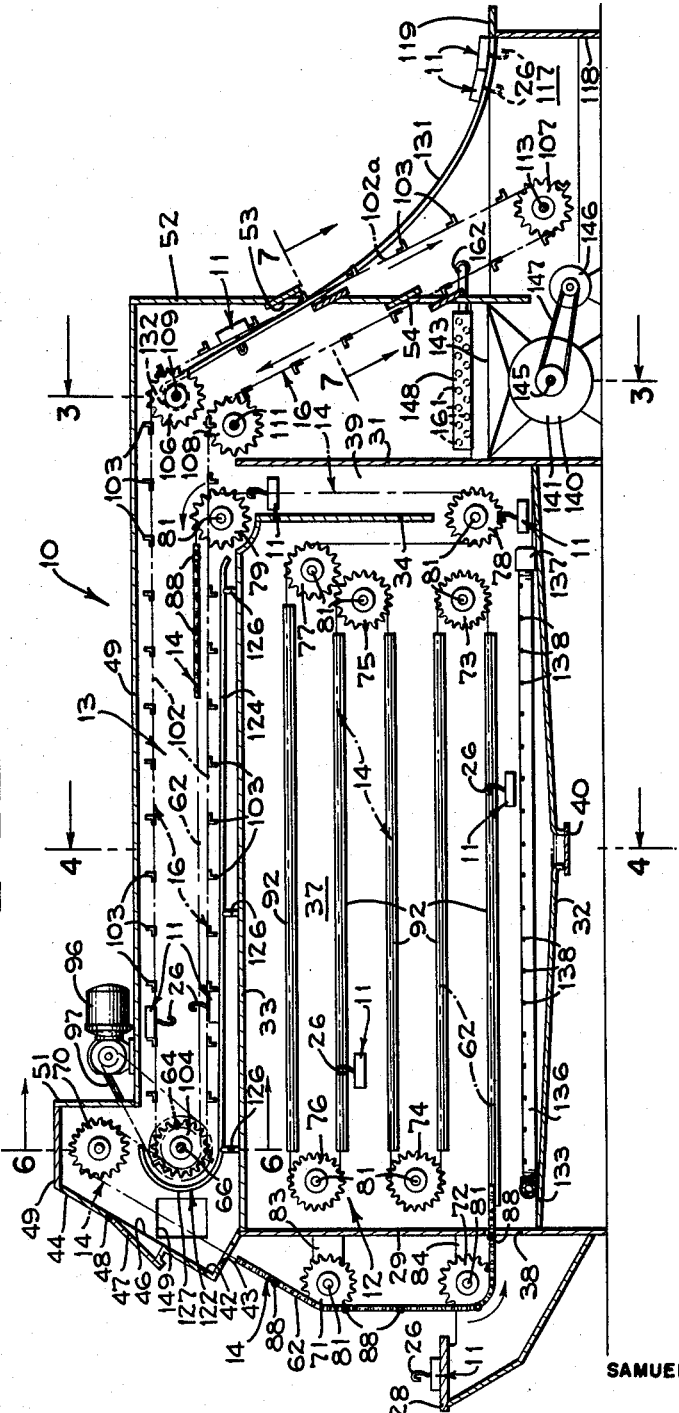

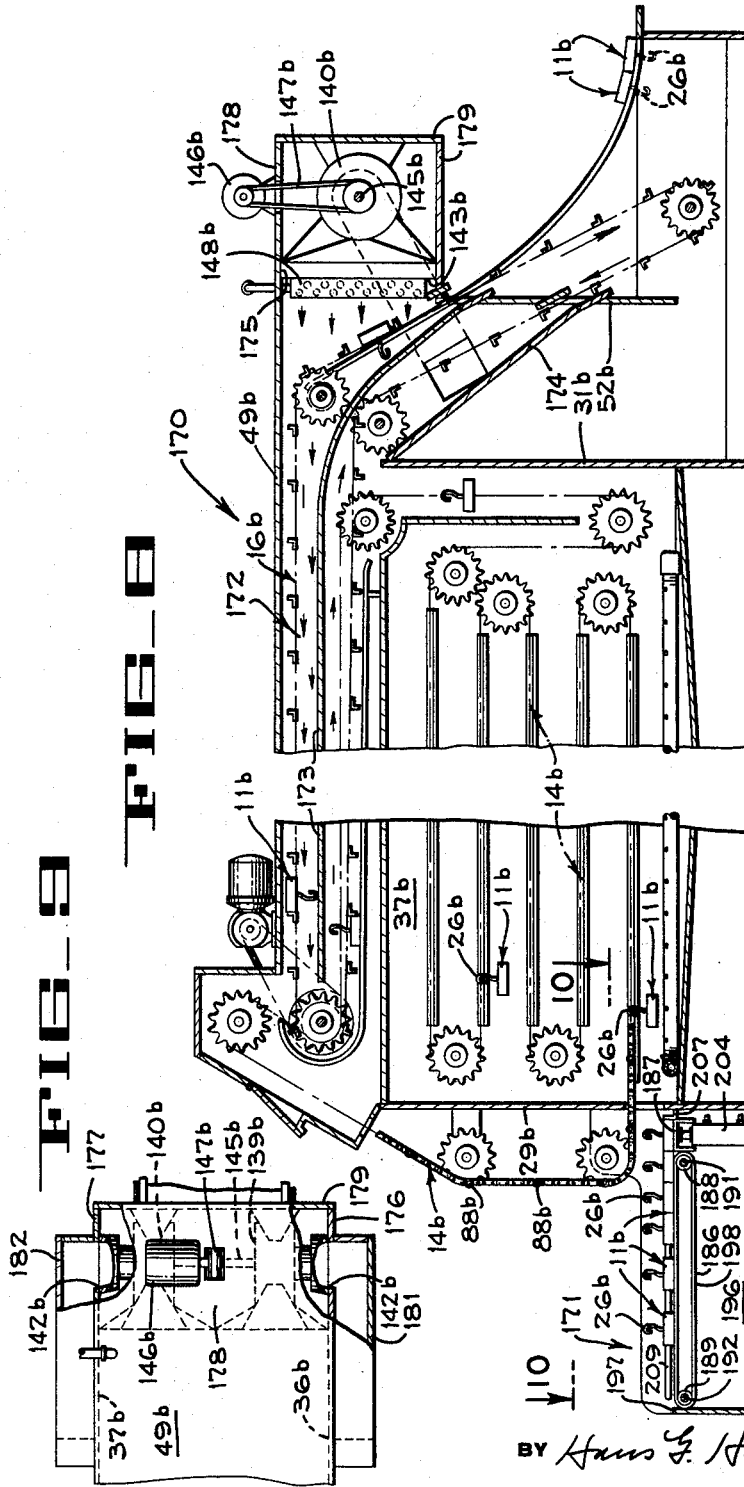

Dec. 15, 1964  S. A. MENCACCI  3,161,526
METHOD OF AND APPARATUS FOR PROCESSING FISH
Filed March 27, 1961  6 Sheets-Sheet 5
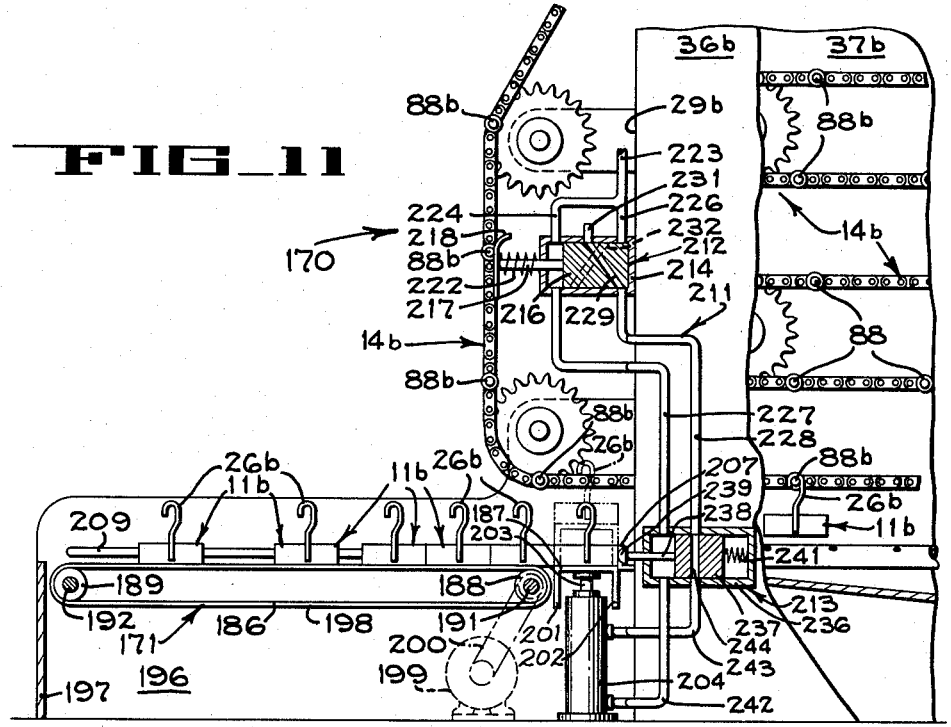
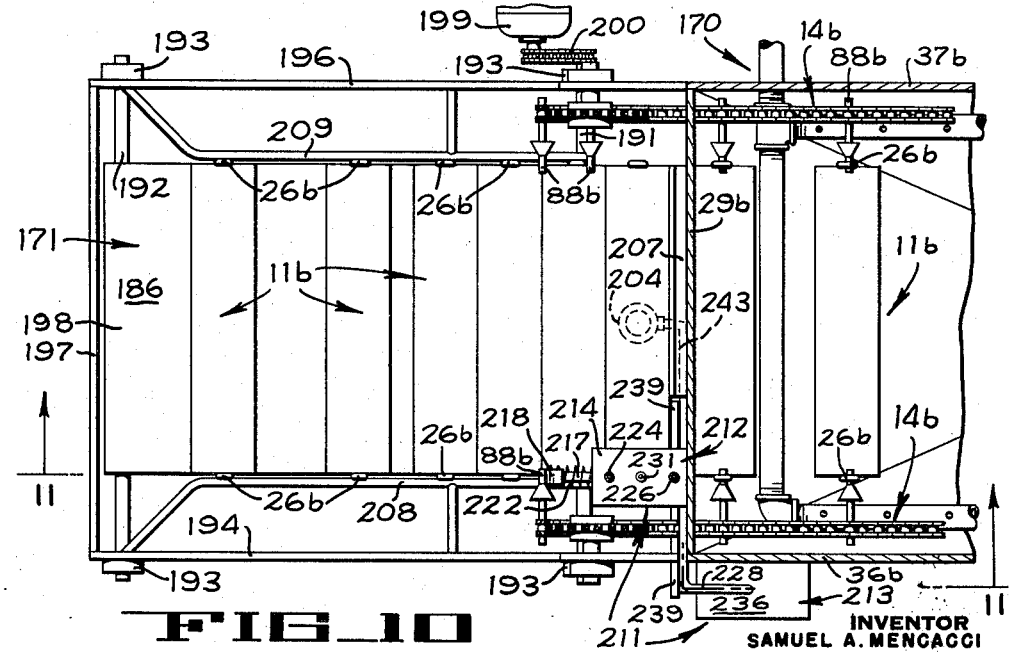
INVENTOR
SAMUEL A. MENCACCI
BY *Hans G. Hoffmeister*
ATTORNEY

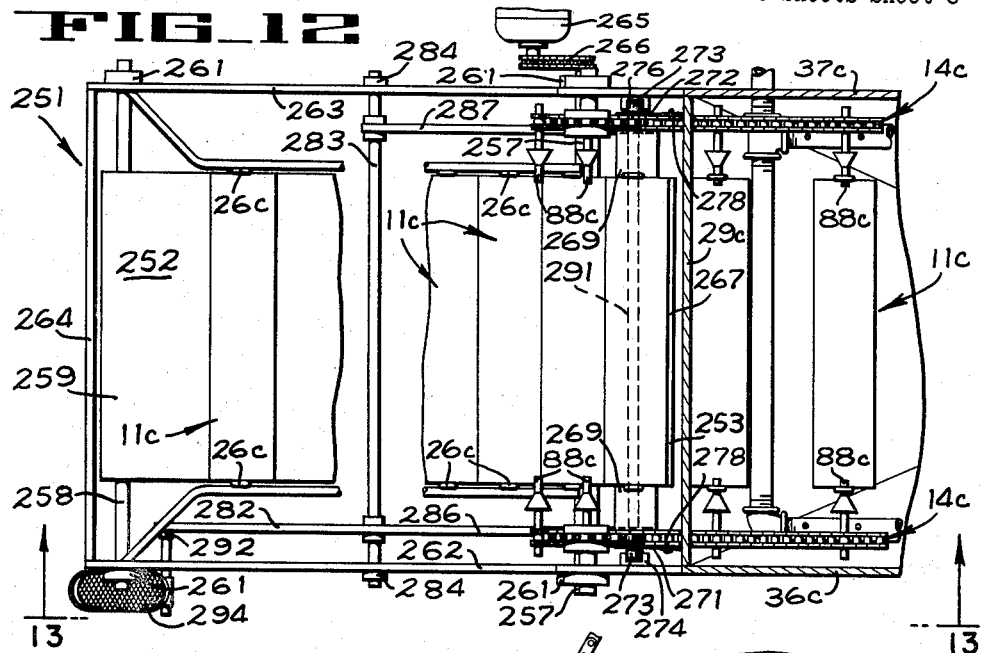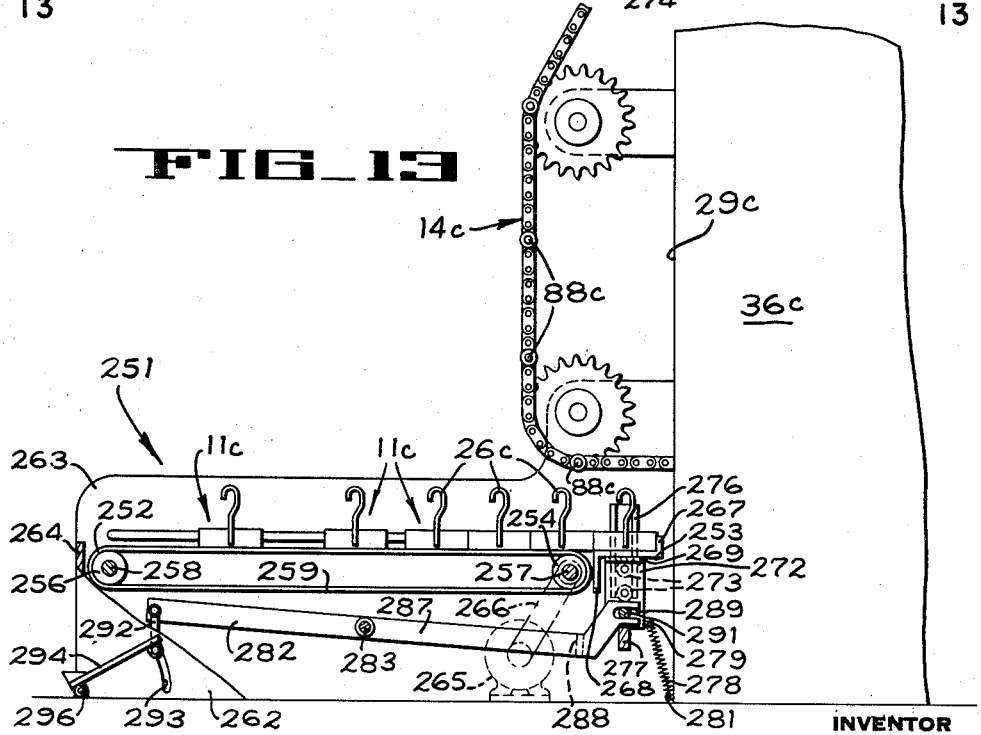

United States Patent Office 3,161,526
Patented Dec. 15, 1964

3,161,526
METHOD OF AND APPARATUS FOR
PROCESSING FISH
Samuel A. Mencacci, St. Nicolas-Waes, Belgium, assignor to International Machinery Corporation S.A., St. Nicolas-Waes, Belgium, a corporation of Belgium
Filed Mar. 27, 1961, Ser. No. 98,423
23 Claims. (Cl. 99—188)

The present invention appertains to tray type fish cookers and more particularly relates to a method of and apparatus for processing fish wherein the containers of fish are moved from an inverted position to an open end up position while in a dehydrating chamber of a cooker.

Tray type fish cookers are well known wherein cans of fish are inverted and are carried through the entire cooker while in the inverted position. This process has the following disadvantages: First, the unchanged position of the fish in the cans in its travel through the cooker cause certain parts of the fish, i.e., those parts of the fish which are in firm contact with other fish and those parts of the fish which are isolated from the heating mediums because of pockets formed in the packed fish, to become improperly cooked. Second, vapors become trapped in the cans which cause condensate to form in the cans when the cans are eventually returned to an upright position at the end of the cooking operation. Third, the fish tend to stick to the grid of the supporting tray upon discharge from the cooker thereby adversely affecting the appearance of the fish.

Another undesirable feature of many well known tray type fish cookers is that they include a cooking chamber and a dehydrating chamber which are in linear alignment with each other thereby rendering the apparatus undesirably long. There is also a high heat loss from the walls of linear cookers because the ratio of their wall area to their volume is large.

It is therefore one object of the present invention to provide an improved method of and apparatus for cooking fish.

Another object is to provide a compact fish cooking apparatus having high thermal efficiency.

Another object is to provide an apparatus for overturning inverted cans of fish while in the dehydrating chamber of the fish cooker.

Another object is to provide a method of cooking fish wherein the vapors are dissipated from the cans to prevent condensate from forming in the cans when the cans are discharged from the machine.

A further object is to provide a method of cooking fish wherein the cans of fish are inverted during approximately the first half of the dehydrating operation to allow juices to gravitate from the cans, and wherein the cans are returned to an upright position during the second half of the dehydrating operation to dissipate vapors from the cans and to dislodge the fish from the carrier grill prior to discharge from the dehydrating chamber.

Still another object is to provide an improved carrier inverting mechanism.

Another object is to provide an improved closed hot air recirculation system for the dehydrating chamber of the fish cooker.

A further object is to provide an improved mechanism for feeding inverted carriers to conveyors passing through the cooker.

These and other objects and advantages of the present invention will become apparent from the following description and the accompanying drawings, in which:

FIG. 1 is a diagrammatic longitudinal central section of the fish cooker of the present invention.

FIG. 2 is an enlarged perspective, partly broken away, of one of the carriers within which cans of fish are confined while being advanced through the fish cooker, the cans being shown in inverted position.

FIG. 3 is an enlarged transverse vertical section taken along lines 3—3 of FIG. 1.

FIG. 4 is an enlarged transverse section taken along lines 4—4 of FIG. 1.

FIG. 5 is an enlarged elevation of the discharge end of the cooker of FIG. 1.

FIG. 6 is an enlarged section taken along lines 6—6 of FIG. 1, showing the drive sprockets for the two conveyors.

FIG. 7 is an enlarged section taken along lines 7—7 of FIG. 1.

FIG. 8 is a diagrammatic longitudinal central section of a second embodiment of the present invention, certain parts being broken away.

FIG. 9 is a plan of a portion of the discharge end of the apparatus of FIG. 8, certain parts being broken away and others shown in section.

FIG. 10 is an enlarged horizontal section of an automatic feeder taken along lines 10—10 of FIG. 8.

FIG. 11 is a diagrammatic vertical section of the automatic feeder of FIG. 10 taken along lines 11—11 of FIG. 10.

FIG. 12 is a plan of a semi-automatic feeder, certain parts of the feeder being broken away and parts of the cooker being shown in section.

FIG. 13 is a vertical side elevation of the feeder of FIG. 12 taken as indicated by lines 13—13 of FIG. 12.

Referring to the apparatus of FIGS. 1-7, the fish cooker 10 (FIG. 1) of the present invention is of the tray type wherein several open cans C (FIG. 2) packed with fish are placed in carriers 11 with the cans in their inverted position, and the carriers are advanced through the cooker. In general, the cooker 10 (FIGS. 1 and 4) comprises a cooking chamber 12, a dehydrating chamber 13 partially superimposed over the cooking chamber 12, a first conveyor 14 for advancing the cans in inverted position through the cooking chamber 12 and through a portion of the dehydrating chamber 13, and a second conveyor 16 that inverts the carriers, placing the cans in an open end up position for discharging the cooked cans of fish from the cooker.

As previously mentioned, the cooker is supplied with carriers 11 loaded with inverted cans C of fish, as illustrated in FIG. 2. The carriers 11 comprise two elements, a grill 20 that also serves to transport the cans along conveyor 14, and a tray 21. Each tray has a bottom panel 22 and skirts 22a for confining the cans C. Each grill has a channel shaped grid section formed of longitudinal rods 23, and bent up transverse rods 23a. The ends of the grid section are closed by plates 24 welded to the grid section, and carrier support hooks 26 are welded to the plates.

To provide the assemblies of FIG. 2 ready for introduction into the cooker, the trays 21 are placed in their open side up position and are loaded with open cans C of fish, with the cans also having their open ends up. The carrier grills 20 are inverted from the position shown in FIG. 2 and are placed on top of the cans C, with the grid section of the carrier lying across the fish in the cans. The entire carrier and can assembly is then inverted to the position shown in FIG. 2 with the open end of the cans directed downwardly. The carriers 11 are then placed on a loading platform 28 (FIG. 1) and are manually transferred from the loading platform to the first conveyor 14 as will be described hereinafter.

The cooking chamber 12 comprises an end wall 29, a sloping floor 32, a roof 33, a vertical discharge partition 34 extending downwardly from the roof, and side walls 36 and 37 (FIG. 4). The above members which define the cooking chamber 12 are connected to their adjacent members in fluid tight engagement. The conveyor 14 and loaded carriers 11 mounted on the conveyor pass through a slot or horizontally elongated opening 38 formed in the end wall 29 (FIG. 1). The discharge partition 34 cooperates with the side walls 36 and 37 and an end wall 31 to define a discharge passage 39 (FIG. 1) through which the first conveyor 14 passes, discharging the carriers 11 from the cooking chamber 12. A drain plug 40 is secured to the sloping floor 32 for draining juices and condensate from the cooking chamber.

As previously mentioned, the dehydrating chamber 13 is partially superimposed upon the cooking chamber 12, and the sides of the dehydrating chamber are formed by the upper portions of the side walls 36 and 37, which are secured in fluid tight engagement to a forwardly inclined wall 42 having an opening 43 for receiving the conveyor 14, a rearwardly inclined wall 44 having an inspection opening 46 therein with a door 47 pivoted at 48 for closing the same, a roof 49 having a stepped portion 51 at one end thereof, and a rear wall 52 having two slots or horizontally elongated openings 53 and 54 therein through which the upper and lower runs of the second conveyor 16 pass. The upper opening 53 is defined by an upper edge 53A and a lower edge 53B. Two slots 55 are formed in the walls 52, each slot extending downwardly from one side of lower edge 53B. Slanted stiffener plates 56 and 57 are welded to the edges 53A and 53B, respectively. The roof 33 of the cooking chamber 12 forms the floor of the dehydrating chamber 13 and the end wall 31 of the steam chamber forms an inner end wall of a vertical portion of the dehydrating chamber 13.

The first conveyor 14 comprises two parallel, spaced endless chains 61 and 62 (FIG. 4) which are independent of each other except for being driven by drive sprockets 63 and 64 keyed to a common drive shaft 66. The shaft 66 is journalled in bearings 67 secured to the wall 36 and to a wall 68 on the opposite side. The chain 62 is trained around the drive sprocket 64 (FIG. 1) and around idler sprockets 70, 71, 72, 73, 74, 75, 76, 77, 78, and 79. Each idler sprocket is mounted on a stub shaft 81 journalled in a bearing 82 (FIG. 4). The bearings 82 associated with the idler sprockets 71 and 72 (FIG. 1) are bolted to brackets 83 and 84 secured to the end wall 29 while the other of the above described bearings are secured to the side wall 37. Since the parts that carry the chain 61 are identical to those that carry the chain 62, they will not be described and will be assigned the same numeral followed by the letter "a."

Each chain 61 and 62 (FIG. 4) has a plurality of evenly spaced carrier supporting pins 88 secured thereto. Each pin 88 includes a cylindrical shank 89 which extends through the associated chain and projects from both sides thereof. Conical hook guides 91 are secured to the inner end portion of each pin 88 and serve to guide the hooks of a carrier onto the inner end portions of the shank in the event a carrier is placed on the pins in a position which is not centered longitudinally between the chains 61 and 62. Thus, the conical guides 91 serve to center the carrier between axially aligned pins 88 on the chains 61 and 62. Each of the horizontal runs of the chains in the cooking chamber 12 is provided with a chain guide 92 having an elongated lower rail 93 along which the associated chain rides, and a shorter lip 94 along which the upper surface of the outer end of each pin on the associated chain rides. It will be seen that this arrangement prevents the weight of the carriers and the cans of fish therein from deflecting the inner ends of the pins downwardly. The several chain guides 92 are secured to the adjacent side walls 36 or 37.

The first conveyor is continuously driven by a variable speed motor 96 (FIGS. 5 and 6) which is connected to the drive shaft 66 by a chain drive 97.

The second conveyor 16 comprises a pair of spaced parallel chains 101 and 102 (FIG. 4) which are interconnected at equally spaced intervals by flight bars 103. The chains 101 and 102 are spaced a distance which is less than the length of the carriers 11 so that the carriers may be supported directly upon the upper run of the chains. The chain 102 (FIG. 1) is trained around a drive sprocket 104 and around idler sprockets 106, 107 and 108. Similarly, the chain 101 (FIG. 4) is trained around a drive sprocket 104a and around idler sprockets 106a (FIG. 3), 107a (FIG. 5), and 108a (FIG. 3). The drive sprockets 104 and 104a are keyed to the drive shaft 66 and are slightly larger pitch diameter than the drive sprockets 63 and 64 of the first conveyor 14. The idler sprockets 106, 106a (FIG. 3) and 108, 108a are keyed to shafts 109 and 111, respectively, which are journalled in bearings 112 bolted to the adjacent wall 36 or 37. The sprockets 107 and 107a (FIG. 5) are secured to a shaft 113 which is journalled in bearings 114. The bearings 114 are secured to vertical side plates 116 and 117 of a frame structure which includes an end plate 118 for supporting a discharge platform 119. The forward end of the side plates 116 and 117 are secured to the rear wall 52 of the dehydrating chamber 13.

Since the drive sprockets 104 and 104a of the second conveyor 16 are slightly larger than the drive sprockets 63 and 64 of the first conveyor 14, it is apparent that the linear speed of the second conveyor 16 is slightly faster than that of the first conveyor 14. Accordingly, the spacing of the flight bars 103 is slightly greater than the spacing of the pins 88 so that the proper synchronization is maintained between the conveyors 14 and 16.

An inverting mechanism 122 (FIG. 1) for returning the inverted cans to their upright position includes adjacent runs of the conveyors 14 and 16 disposed in the dehydrating chamber 13. As seen in FIG. 1, the upper run of the first conveyor 14 is horizontal and is disposed above the lower run of the second conveyor 16. The lower run of the second conveyor is inclined upwardly from the sprocket 108 to the drive sprocket 104. Three conveyor interchange and carrier inverting rails 124 (FIGS. 1 and 4) are supported from the roof 33 by a plurality of pedestals 126 in an inclined position parallel to the lower run of the second conveyor 16. Arcuate end portions 127 of each rail are curved around the drive sprockets 104 and 104a and serve to guide the carriers 11 as they pass around sprockets 104 and come to rest between flights 103 or the upper run of the second conveyor 16.

The path of the carriers through the cooker will now be described. Loaded carriers 11 are placed manually upon the supporting pins 88 of the first conveyor 14 with the cans having their open ends down, as described. The carriers are carried through the cooking chamber 12 and into the dehydrating chamber 13, the conveyors being synchronized so that the carriers are brought between adjacent flight bars 103 of the second conveyor 16. The first conveyor 14 then carries the carriers along the inclined rails 124 which rails support the carrier grills 23 and gradually raises the carriers, thereby causing disengagement of the hooks 26 from their associated pins 88 on the conveyor 14. The flight bars 103 of the second conveyor 16 then engage the carriers and continue their advance along the rails and around the drive sprockets 104 and 104a to thereby return the carriers to a position on the upper run of the second conveyor wherein the cans are upright. The upper run advances the carriers toward the discharge end of the cooker.

Upon continued advancement of the carriers 11 by the second conveyor 16, the carriers are moved around the sprockets 106 and 106a and down an inclined run 102a of the conveyor. Along this run, the carriers gravitate against the forward flight bars. A pair of curved discharge rails 131 (FIGS. 1 and 5) are connected at their lower ends to the discharge table 119 and at their upper ends to collars 132 (FIG. 3) journalled on the shaft 109. The rails 131 are spaced apart and slidably engage the hooks 26 (FIG. 5) of the carriers to prevent transverse movement of the carriers so as to maintain lateral alignment of the carriers as the curvature of the discharge rails effects a withdrawal of the carriers from the conveyor 16. The carriers then slide down the rails 131 and come to rest at the discharge table 119 where the carriers are removed from the table. It will be noted that the horizontally elongated opening 53 in the end plate 52 includes slots 55 (FIGS. 5 and 7) which permits the hooks 26 of the carriers 11 to pass through the end plate while the bodies of the carriers pass through the narrow portion of the elongated opening 53.

The heating medium in the cooking chamber 12 is steam. The steam is directed into the cooking chamber from any suitable source through a manifold 133 (FIG. 4) which is connected to two longitudinally extending steam distribution pipes 134 and 136. The distal ends of the distribution pipes are closed with caps 137 (FIG. 1) and steam is directed into the cooking chamber 12 through a plurality of perforations 138 in the pipes 134 and 136.

The heating and drying medium used in the dehydrating chamber 13 is hot air. A pair of blowers 139 and 140 (FIGS. 1 and 3) are mounted between the side walls 36 and 37 and end walls 31 and 52 for the purpose of directing air into the dehydrating chamber 13. Each blower includes a housing 141 having an inlet opening 142 and a flared outlet opening 143. The blowers each have an impeller (not shown) mounted on a common shaft 145 which is driven by a motor 146 connected thereto by a V-belt drive 147. The air from the outlet openings 143 is directed upwardly through a heat exchanger 148 and along the vertical portion of the dehydrating chamber 13. The air then flows through the horizontal portion of the dehydrating chamber 13 and laterally through discharge ports 149 (only one shown in FIG. 1) at the forward end of the side walls 36 and 37. The air returns to the inlet openings 142 of the blowers through external ducts 150 and 151 (FIGS. 3 and 4) each of which has a part that extends horizontally along the associated walls 36 or 37, respectively, as indicated in FIGS. 4 and 6, and which communicate with downwardly extending portions 152 and 153 as shown in FIGS. 3 and 5.

The inner wall of the duct 151 is defined by the side wall 37 of the cooker. The previously mentioned wall 68 forms the outer wall of the horizontal portion of the duct 151 and this wall is integral with inturned legs 154 and 156 connected to wall 37 to form a channel. Similarly, the inner wall of the duct 150 is formed by the wall 36 of the cooker, and the horizontal portion of the duct 150 is formed by a channel 157 attached to the wall 36. The downwardly extending portions 152 and 153 (FIG. 4) of the ducts 150 and 151, respectively, likewise are comprised of channels 158 and 159 attached to the walls 36 and 37, respectively.

With this construction, a closed circuit is provided for the hot air which is used in the dehydrating chamber 13. The blowers 141 and 142 continuously recirculate the air through the heat exchanger 148 and dehydrating chamber 13.

As shown in FIGS. 1 and 3, the heat exchanger 148 includes a plurality of tubes 161 which are connected to a supply conduit 162 through which steam is directed for providing the heat necessary for raising the temperature of the air passing over the tubes to the desired dehydrating temperature. It is to be understood, however, that other types of heat exchangers may be used, such as electrically or gas heated units.

In the operation of the fish cooker, the motors 96 and 146 (FIG. 1) are started thereby continuously driving the conveyors 14 and 16 and the blowers 139 and 140. Steam is directed into the cooking chamber 12 to maintain an atmosphere of steam therein at 212° F. at atmosphere pressure. It is to be particularly noted that the upper edge of the horizontally elongated opening 38 in the forward end wall 29 is lower than the bottom edge of the partition 34. This assists in preventing the discharge of steam through the opening 38 into the operator's face. Steam is also directed into the heat exchanger 148 to raise the temperature of the air circulating therein to a point in the range of 212° F. to 220° F. Temperature substantially higher than 220° F. will cause the fish to stick to the carrier grill 23 (FIG. 2) before the cans can be turned to an upright position by the inverting mechanism 122.

The pressure in the dehydrating chamber 13 is relatively low, so that any steam that is drawn into the dehydrating chamber is unsaturated in the chamber. It has also been found that the velocity of air traveling through the dehydrating chamber is an important factor in the proper cooking of the fish as will be explained hereinafter. In the present cooker an air velocity within the range of 1000 to 2500 ft. per minute has been found to be the most effective.

To summarize the operation of the embodiment of the invention shown in FIG. 1, the raw fish is packed in cans, the cans are placed in the carriers 11 open side up, and the carriers and cans are manually inverted and placed on the feed platform 28. The filled carriers 11 are then manually hung on the pins 88 (FIG. 4) of the first conveyor 14, with the cans in the inverted position. The inverted cans of fish are carried through the cooking chamber 12 wherein the fish is cooked by steam, and the liquids therein are free to drain from the inverted cans, the liquid collecting on the sloping floor 32 for eventual discharge from the cooker.

After the cooked fish have passed through the discharge passage 39 of the cooking chamber 12 and into the dehydrating chamber 13, the hot air acts on the fish to remove excess moisture therefrom and to impart a desirable fried appearance to the fish. It has been discovered that best results occur when the cans of fish are in their inverted position for substantially the first half of the travel of the fish through the dehydrating chamber 13 and are in an upright position for the remainder of their travel. Accordingly, as the cans of fish are advanced to the left (FIG. 1) by the lower run of the second conveyor 16, they remain in their inverted position and liquids continue to drain from the fish. It will also be apparent that during this travel to the left, vapor will form and be trapped in the inverted cans because the cans are above the condensation temperature when they are in the dehydrating chamber. However, this vapor escapes from the cans upon continued treatment by the hot air after the cans have been returned to an upright position by the inverting mechanism 122.

When the cans are returned to the upright position by the inverting mechanism 122, the fish will no longer be supported by the grills 23 of the carriers 11, rather, the grills will be supported by the sides of the cans. Thus the fish are urged away from the grill by the force of gravity and the fish do not stick to the grill. The fish are discharged from the fish cooker 10 by means of the curved discharge rails 131 and are thereafter manually removed from the discharge platform 119.

In the above described first embodiment of the invention, the carriers are manually fed to the conveyor 14. Also the dehydrating chamber provides a relatively low fry temperature. A modification of the invention, shown in FIGS. 8, 9, 10 and 11, discloses a fish cooker 170 having an automatic feeder 171 and a divided dehydrating chamber 172 arranged to provide a deeper fry.

Since the fish cooker 170 differs from the cooker 10 only in the addition of the automatic feeder 171 and in the construction of the dehydrating chamber, only these parts will be described in detail. Parts of the cooker 170 which are identical to the parts of the cooker 10 will be assigned the same numerals followed by the suffix "b."

As shown in FIG. 8, the dehydrating chamber 172 of the fish cooker 170 includes a longitudinally extending baffle 173 which separates the upper run of the second conveyor 16b from the lower run thereof. The baffle 173 is secured to the side walls 36b and 37b, and to the end wall 52b. A floor 174 is connected in fluid tight engagement to the ends walls 31b and 52b and to the side walls 36b and 37b. The upper part of the end wall 52b is provided with an opening 175. The blowers 139b (FIG. 9) and 140b, and the heat exchanger 148b are mounted between extensions 176 and 177 of the side walls 36b and 37b, an extension 178 of the roof 49b, and an L-shaped blower supporting wall 179. The wall 179 is secured to the end wall 52b and to the extensions 176 and 177. The blower impellers (not shown) are mounted on the common shaft 145b which is driven by the motor 146b through a V-belt drive 147b. It can be seen that the outlet openings 143b of the blowers direct air through the heat exchanger 148b and into the dehydrating chamber 172 above the baffle 173. The air flows counter to the direction of movement of both runs of the conveyor 16b, i.e., toward the left end (FIG. 8) of the cooker above the baffle 173 and toward the right end thereof below the baffle 173. The inlet openings 142b (FIG. 9) of the blowers 139b and 140b are connected by ducts 181 and 182, respectively, to the area below the baffle 173 at points adjacent the discharge end of the cooker 170. The above described structure defines a closed recirculating hot air system arranged to direct the hot air in a direction opposite to that in which the fish are moving. This use of a counter current motion of fish and hot air along the entire effective length of the conveyor 16b renders the temperature differential relatively constant so that hotter air temperatures may be used in the cooker 170 without causing the fish to stick to the carriers 11b. With this arrangement the cooker can be operated with air temperatures within the range of 220° F. to 310° F. with the result that a deeper fry may be imparted to the fish. Obviously lower temperatures may be used if desired.

The automatic feeder 171 (FIGS. 10 and 11) comprises a continuously driven feed conveyor 186 and a vertically movable table 187. The conveyor 186 includes a drive roll 188 and a drive roll 189 secured to shafts 191 and 192, respectively, that are journalled in bearings 193. The bearings 193 are secured to extensions 194 and 196 of the walls 36b and 37b of the cooker. The walls are interconnected by an end plate 197. An endless belt 198 is trained around the rollers 188 and 189 and is continuously driven at a speed somewhat in excess of that of the first conveyor 14b by a motor 199 which is connected to the drive shaft 191 by a chain drive 200. The belt 198 is driven faster than the conveyor 14b in order to place carriers on the table 187 and allow ample time for the table to reciprocate vertically and load a carrier onto each aligned pair of pins 88b as the pins move past the table 187.

The vertically movable table 187 (FIG. 11) includes downwardly extending flanges 201 and 202 and is disposed immediately adjacent the drive roll 188 to receive one carrier 11b at a time from the feed conveyor 186. The table 187 is mounted on the actuating rod 203 of a vertically extending air cylinder 204 which is arranged to intermittently move the table 187 from the full line position of FIG. 11 wherein the table receives carriers 11b from the conveyor 186, to a raised position shown in broken lines wherein the carriers are in position to cause the hooks 26b of the carriers 11b to engage the carrier supporting pins 88b of the first conveyor 14b. A stationary carrier stop in the form of an angle bar 207 is rigidly secured to the wall 29b in position to terminate movement of the carriers 11b to the right (FIG. 11) as they move from the feed conveyor 186 onto the table 187. Carrier guides 208 and 209 are provided to guide the carriers 11b onto the table 187 and are secured to the extensions 194 and 196, respectively.

Since the table 187 must be reciprocated in timed relation with the movement of the first conveyor 14b, and should only be raised after a carrier 11b is fully supported on the table 187 and is disposed against the stop 207, the following control system 211 is provided.

The control system 211 comprises a timing valve 212 mounted on the end wall 29b and a carrier positioning valve 213 mounted on the side wall 36b. The timing valve 212 includes a housing 214 having a reciprocable core 216 therein. A plunger 217 extends through an opening in the housing 214 and is rigidly secured to a timing finger 218. A spring 222 connected between the finger 218 and a wall of the housing 214 normally urges the finger 218 to move to the left as viewed in FIG. 11.

Air is directed into the timing valve housing 214 from any suitable source of high pressure air by means of a supply conduit 223 having branch conduits 224 and 226. High pressure air is discharged from the valve 212 either through a conduit 227 or a conduit 228, depending upon the position of the valve core 216. When the core 216 is positioned as shown in FIG. 11, high pressure air flows from the branch conduit 224 through the valve housing 214 and out the conduit 227. At this time, venting occurs by passage of air through the conduit 228, into the housing 214, through a passage 229 in the core 216, and out of the housing by means of a vent port 231.

When the core 216 is shifted to the left (FIG. 11), high pressure air flows from the branch conduit 226 through the right end of the housing 214 and into the conduit 228. With the core 216, in this position, venting occurs by the flow of air through the conduit 227, through a passage 232 in the core 216, and through the vent port 231.

High pressure air is directed into the positioning valve 213 through either the conduit 227 or the conduit 228 depending upon the position of the valve core 216. The positioning valve 213 comprises a housing 236 having a reciprocable core 237 therein. A plunger 238 extends through an opening in the housing 236 and connects the core 237 to a finger 239 which is disposed in position to be contacted and shifted by a carrier 11b as it is moved into lifting position on the table 187 and against the stop 207. A spring 241 positioned between a wall of the housing 236 and the core 237 normally urges the core to the left as viewed in FIG. 11. A conduit 242 connects the housing 236 to the lower end of the air cylinder 204 and a conduit 243 connects the housing 236 to the upper end of the air cylinder 204. A passage 244 in the core 237 connects the conduit 228 to the conduit 243 when a carrier 11b is in lifting position on the table 187.

As mentioned, in the operation of the automatic feeder 171 (FIG. 11), the feed conveyor 186 is driven at a speed somewhat in excess of that of the first conveyor 14b. Carriers 11b are advanced by the feed conveyor 186 one at a time onto the table 187 and come to rest against the stationary stop 207 after contacting the finger 239 and moving the core 237 to the position shown in FIG. 11. The hydraulic cylinder 204 is not actuated, however, until one of the carrier supporting pins 88b contacts and moves the timing finger 218 and core 216 to the position shown in FIG. 11. High pressure air is then directed from the conduit 223, through the conduit 224, through the valve housing 214, through the conduit 227, through the valve housing 236, through the conduit 242 into the lower end of the air cylinder 204 thereby raising the table 187 and carrier 11b thereon into position to be engaged by the pins 88b. It will be noted that the flange 201 maintains the carrier which is immediately adjacent the table 187 from movement toward the right until the table is lowered, and that the flange 202 maintains the finger 239 in the position shown in FIG. 11 until the table is lowered.

During the upward movement of the table 187, air is vented from the upper portion of the cylinder 204 through the conduit 243, the passage 244, the conduit 228, the passage 229 and the vent port 231. After the first conveyor 14b has moved a distance sufficient to advance a pair of pins 88b under the associated hooks 26b of the raised carrier 11b, the finger actuating pin 88b moves out of engagement with the finger 218 thereby permitting the spring 222 to move the valve core 216 to the left end of the housing 214.

High pressure air is then directed from the conduit 223, through the conduit 226, through the housing 214, through the conduit 228, through the passage 244, through the conduit 243 and into the upper end of the air cylinder 204. The air vented from the lower portion of the cylinder 204 flows through the conduit 242, through the housing 236, through the conduit 227, through the passage 232, and through the vent port 231. As the table 187 reaches the bottom end of its stroke, the finger 239 and valve core 237 move to the left. The air cylinder will not be actuated again until another carrier 11b is moved into position to actuate the valve core 237 even though the finger 218 may be actuated by one or more of the pins 88b as they continuously pass thereby. It will be understood, however, that during normal operation carriers will be supplied to the table at a rate which will permit the loading of a carrier on all pairs of supporting pins 88b as they pass thereby.

A semi-automatic feeder 251 is shown in FIGS. 12 and 13. Parts associated with the feeder 251 which are identical to those disclosed in the first embodiment of the invention will be assigned the same numerals followed by the suffix "c."

The feeder 251 comprises a feed conveyor 252 and a table 253. The feed conveyor comprises a drive roller 254 (FIG. 13) and a driven roller 256 secured to shafts 257 and 258, respectively, and having an endless belt 259 trained therearound. The shafts 257 and 258 are journalled in bearings 261 which are secured to extensions 262 and 263 of the side walls 36c and 37c interconnected by an end wall 264. The conveyor 252 is continuously driven at a speed somewhat in excess of that of the first conveyor 14c, by a motor 265 that is connected to the shaft 257 by a chain drive 266.

The table 253 includes an upwardly turned stop flange 267 and a downwardly turned carrier arresting flange 268 disposed adjacent the drive roller 254. The table is secured to a plate 269 having downwardly extending end flanges 271 and 272 (FIG. 12). Two vertically spaced rollers 273 are journalled on each flange 271 and 272 and are guided by vertically extending channel guide tracks 274 and 276, respectively. The tracks 274 and 276 are secured to the extension 262 and 263, respectively. A stop bar 277 is welded to and extends between the extensions 262 and 263 and acts as a stop to hold the upper surface of the table 253 in the plane of the upper run of the endless belt 259 when the table 253 is in its lowermost position. Springs 278 connected between pins 279 (only one being shown) secured to the flanges 271 and 272 and pins 281 (only one being shown) secured to the end wall 29c are effective to urge the table downward.

The table 253 is moved vertically by a swing frame 282 which is secured to a shaft 283 that is journalled in bearings 284 secured to the extensions 262 and 263. The swing frame 282 includes a pair of parallel arms 286 and 287 which are welded to the shaft 283 and to a lateral brace 288 near one end thereof. The ends of the arms 286 and 287 near the brace 288 are upturned and provided with horizontal slots 289 so as to engage a rod 291 secured to and extending between the flanges 271 and 272. The free end of the arm 286 is apertured to pivotally receive one end of a link 292. The other end of the link 292 extends through an arcuate slot 293 in the extension 262 and is pivotally connected to one end of a pedal 294. The other end of the pedal 294 is pivoted on a pin 296 which is welded to and projects outwardly from the extension 262.

In the operation of the semi-automatic feeder 251, the conveyor 252 first moves a carrier 11c onto the table 253. The operator then visually observes the position of the carrier supporting pins 88c and, at the proper time, steps on the pedal 294 to raise the carrier 11c into position so that the pins 88c will engage the hook 26c of the carrier 11c. Upon engagement, the pedal 294 is released and the springs 278 return the table 253 to the position shown in FIG. 13 to receive another carrier 11c while the carrier on the pins 88c is moved through the cooker by the conveyor 14c.

It is to be understood that the cooker 10 (FIG. 1) of the first embodiment of the invention and the cooker 170 (FIG. 8) of the second embodiment of the invention may be fed manually or by either the automatic feeder 171 (FIG. 11) or the semi-automatic feeder 251 (FIG. 13).

From the foregoing description it is apparent that a fish cooker may be manually, automatically or semi-automatically fed. Both forms of the fish cooker have a high thermal efficiency since the dehydrating chamber is partially superimposed upon the cooking chamber with the common dividing walls between the two chambers readily transmitting heat from one chamber to the other. This construction also provides a compact machine having a lower ratio of wall area to volume than does an in line type cooker. This high thermal efficiency is also aided by providing a closed recirculation system for the hot air being used in the dehydrating chamber. The above described cooker also utilizes a simple, but unique, inverting mechanism which effects a return of the fish to an upright position upon completion of approximately one half of their travel through the dehydrating chamber to evaporate vapors which had been trapped in the cans when the cans were inverted and to remove the fish from the carrier grill to prevent sticking.

While several embodiments of the present invention have been shown and described, it will be understood that various other changes and modifications may be made without departing from the spirit of the invention or the scope of the appended claims.

Having thus described the present invention and the manner in which the same is to be used, what is claimed as new and desired to be protected by Letters Patent is:

1. An apparatus for cooking fish adapted to be packed in open ocontainers and constrained in the containers by grill type carriers comprising, a cooking chamber, a dehydrating chamber communicating with the cooking chamber, means for carrying the containers through said cooking chamber and a portion of said dehydrating chamber in an inverted position, means in said dehydrating chamber for overturning said containers from the inverted position to an upright position, means for carrying the containers through the remaining portion of said dehydrating chamber in an upright position, means for directing steam into said cooking chamber, and means for directing hot air into said dehydrating chamber.

2. An apparatus for cooking fish adapted to be packed in open containers and constrained in the containers by grill type carriers comprising, a cooking chamber, a dehydrating chamber located above said cooking chamber and communicating with said cooking chamber, means for carrying the containers through said cooking chamber and a portion of said dehydrating chamber in an inverted position, means in said dehydrating chamber for overturning said containers from the inverted position to an upright position, means for carrying the containers through the remaining portion of said dehydrating chamber in an upright position, means for directing steam into said cooking chamber, and means for directing hot air into said dehydrating chamber.

3. An apparatus for cooking fish adapted to be packed in open containers and constrained in the containers by grill type carriers comprising, a cooking chamber having a plurality of interconnected walls, a dehydrating chamber located above said cooking chamber and communicating with said cooking chamber, said dehydrating chamber being defined by a plurality of walls at least two of which are walls of the cooking chamber, means for carrying the containers through said cooking chamber and a portion of said dehydrating chamber in an inverted position, means in said dehydrating chamber for overturning said containers from the inverted position to an upright position, means for carrying the containers through the remaining portion of said dehydrating chamber in an upright position, means for directing steam into said cooking chamber, and means for directing hot air into said dehydrating chamber.

4. An apparatus for cooking fish adapted to be packed in open containers and constrained in the containers by grill type carriers comprising, a cooking chamber, a dehydrating chamber located above said cooking chamber and communicating with said cooking chamber, means for carrying the containers through said cooking chamber and a portion of said dehydrating chamber in an inverted position, means in said dehydrating chamber for overturning said containers from the inverted position to an upright position, means for carrying the containers through the remaining portion of said dehydrating chamber in an upright position, means for directing steam into said cooking chamber, a heat exchanger in one end of said dehydrating chamber, a blower connected to said one end of said dehydrating chamber for discharging air through said heat exchanger and into said dehydrating chamber, a duct connected to the other end of said dehydrating chamber and to the inlet end of said blower to return the air to said blower for recirculation through said dehydrating chamber, and means for heating said heat exchanger.

5. An apparatus for cooking fish adapted to be packed in open containers and constrained in the containers by grill type carriers comprising, a cooking chamber, a dehydrating chamber located above said cooking chamber and communicating with said cooking chamber, a horizontal baffle in said dehydrating chamber dividing said dehydrating chamber into two parts which communicate with each other at one end thereof, means for carrying the containers along a predetermined path through said cooking chamber and through the portion of said dehydrating chamber which is below said baffle in an inverted position, means in said dehydrating chamber for overturning said containers from the inverted position to an upright position, means for carrying the containers through the portion of the dehydrating chamber that is above said baffle in an upright position, means for directing steam into said cooking chamber, a heat exchanger in the other end of said dehydrating chamber above said baffle, a blower connected to said other end of said dehydrating chamber for discharging air through said heat exchanger and into said dehydrating chamber, a duct connected to said other end of said dehydrating chamber below said baffle and to the inlet end of said blower to return the air to said blower for recirculation through said dehydrating chamber in a direction opposite to the direction of movement of the containers through said dehydrating chamber, and means for heating said heat exchanger.

6. An apparatus for cooking fish adapted to be packed in open containers and constrained in the containers by grill type carriers comprising, a cooking chamber, a dehydrating chamber located above and communicating with said cooking chamber, a first conveyor for carrying the grill type carriers with the containers therein in an inverted position through said cooking chamber and having a horizontal run extending through said dehydrating chamber, a second conveyor extending through said dehydrating chamber and having a run disposed adjacent to said horiozntal run of said first conveyor, means in said dehydrating chamber for transferring the carriers from said first to said second conveyor and for overturning the carriers from the inverted to an upright position, means for directing steam into said cooking chamber, means for directing hot air into said dehydrating chamber, and means for driving said conveyors.

7. An apparatus for cooking fish adapted to be packed in open containers and constrained in the containers by grill type carriers having carrier supporting hooks comprising, a cooking chamber, a dehydrating chamber located above and communicating with said cooking chamber, a first conveyor for carrying the grill type carriers with the containers therein in an inverted position through said cooking chamber and a portion of said dehydrating chamber, said first conveyor having a horizontal run extending through said dehydrating chamber and including a pair of spaced endless chains, each chain having a plurality of equally spaced carrier supporting pins secured thereto and projecting inwardly therefrom for engaging the hooks on the carrier to support the carriers, a second conveyor extending through said dehydrating chamber and disposed between said pair of spaced chains, means in said dehydrating chamber for effecting a transfer of said carriers from said first conveyor to said second conveyor and for moving said carriers from an inverted to an upright position, drive means connected to said first and said second conveyors to continuously drive the same, means for directing steam into said cooking chamber, and means for directing hot air into said dehydrating chamber.

8. An apparatus for cooking fish adapted to be packed in open containers and constrained therein by grill type carriers having carrier supporting hooks thereon comprising, a cooking chamber, a dehydrating chamber communicating with said cooking chamber, a first conveyor extending through said cooking chamber and having a horizontal run extending through said dehydrating chamber, means on said first conveyor for engaging the carrier supporting hooks and for supporting the carriers with the containers in an inverted position during movement of said first conveyor through said cooking chamber and into said dehydrating chamber, a second conveyor extending through said dehydrating chamber and having a run disposed adjacent to said horizontal run of said first conveyor, a plurality of evenly spaced flight bars secured to and extending across said second conveyor, a rail in said dehydrating chamber inclined upwardly toward one end of said second conveyor and having a portion curved around said one end, said rail being disposed in position for engaging said carriers and for raising the same to disengage the hooks from said hook engaging means and for causing engagement of said carriers with said flight bars for advancement thereby within said curved portion of said rail to move the carriers from an inverted to an upright position on said second conveyor for discharge thereby from said dehydrating chamber, means connected to said first and second conveyor for driving the same, means for directing steam into said cooking chamber, and means for directing hot air into said dehydrating chamber.

9. An apparatus for cooking fish adapted to be packed in open containers and constrained therein by grill type carriers having carrier supporting hooks thereon comprising, a cooking chamber having an inlet end, a dehydrating chamber communicating with said cooking chamber, a first conveyor extending through said cooking chamber and having a horizontal run extending through said dehydrating chamber, means on said first conveyor for engaging the carrier supporting hooks and for supporting the carriers with the containers in an inverted position during movement of said first conveyor through said cooking chamber and into said dehydrating chamber, a feed conveyor disposed adjacent said inlet end of said cooking chamber for advancing inverted carriers toward said cooking chamber, a table disposed below said first conveyor for receiving carriers one at a time from said feed conveyor, means for vertically reciprocating said table in timed relation with the movement of said first conveyor to raise said carriers into position wherein the hooks engage the hook engaging means on said first conveyor for advancement thereby through said cooking chamber and into said dehydrating chamber, a second conveyor extending through said dehydrating chamber and having a run disposed adjacent to said horizontal run of said first conveyor, means in said dehydrating chamber for transferring the carriers from said first to said second conveyor and for moving the carrier from an inverted to an upright position, means connected to said first and second conveyor to continuously drive the same, means connected to said feed conveyor for driving the same at a speed in excess of that of said first and second conveyors, means for directing steam into said cooking chamber, and means for directing hot air into said dehydrating chamber.

10. An apparatus for cooking fish adapted to be packed in open containers and constrained therein by grill type carriers comprising, a cooking chamber, a dehydrating chamber partially located above and communicating with said cooking chamber, a first conveyor for carrying the grill type carriers with the containers therein in an inverted position through said cooking chamber and having a horizontal run extending through said dehydrating chamber, a second conveyor extending through said dehydrating chamber and having a run disposed adjacent to said horizontal run of said first conveyor and a downward sloping run extending out of said dehydrating chamber, means in said dehydrating chamber for transferring the carriers from said first to said second conveyor and for moving the carriers from an inverted to an upright position, a downward sloping slideway disposed in tangent relation with respect to said downward sloping run of said second conveyor, said slideway sloping downwards and away from said sloping run of said conveyor for effecting a removal and gravitational discharge of said carriers from said second conveyor, means for directing steam into said cooking chamber, means for directing hot air into said dehydrating chamber, and means connected to said conveyors for driving the same.

11. In an apparatus for cooking fish adapted to be packed in open containers and constrained in the containers by grill type carriers having supporting hooks thereon comprising, a pair of parallel conveyor chains mounted for movement through a cooker, a plurality of hook engaging pins secured to each chain at evenly spaced intervals therealong, a vertically movable table disposed below said chains, a feed conveyor disposed in position to advance carriers onto said table when said table is in its lowermost position, means for vertically reciprocating said table and the carrier thereon in timed relation with the movement of said chains for locating the carrier supporting hooks in position to be engaged by predetermined ones of said pins, and drive means connected to said chains and to said feed conveyor to drive the same.

12. In an apparatus for cooking fish adapted to be packed in open containers and constrained in the containers by grill type carriers having supporting hooks thereon comprising, a pair of parallel conveyor chains mounted for movement through a cooker, a plurality of hook engaging pins secured to each chain at evenly spaced intervals therealong, a vertically movable table disposed below said chains, a feed conveyor disposed in position to advance carriers onto said table when said table is in its lowermost position, a swing frame mounted for pivotal movement and having said table secured to one end thereof, a pedal adjacent the other end of said swing frame, a link pivotally connecting said other end of said frame to said pedal whereby actuation of said pedal is effective to raise said table and a carrier supported thereon to locate the carrier supporting hooks in position to be engaged by predetermined ones of said pins, and drive means connected to said chains and to said feed conveyor for driving the chains at a predetermined speed and for driving the conveyor at a speed somewhat in excess of that of said chains.

13. In an apparatus for cooking fish adapted to be packed in open containers and constrained in the containers by grill type carriers having supporting hooks thereon comprising, a pair of parallel conveyor chains mounted for movement through a cooker, a plurality of hook engaging pins secured to each chain at evenly spaced intervals therealong, a vertically movable table disposed below said chains, a feed conveyor disposed in position to advance carriers onto said table when said table is in its lowermost position, a pneumatic cylinder mounted below said table and having its actuating element secured to said table in supporting relation, a first valve connected to said cylinder and having a valve core responsive to the presence of a carrier on said table for partially preparing said cylinder for an upward movement, and a second valve connected to said cylinder and having a valve core shiftable into position by each of said pins on one of said chains in turn to completely prepare the cylinder for upward movement, means for directing air through said prepared valves and into said cylinder to raise said table, and drive means connected to said chains and to said feed conveyor for driving the chains at a predetermined speed and for driving the feed conveyor at a speed somewhat in excess of that of said chains.

14. A method of cooking fish packed in open containers and constrained in the containers by a grill type carrier which comprises the steps of passing the containers of fish in an inverted position through an atmosphere of steam, advancing the containers of fish from the steam atmosphere into and through an atmosphere of hot air, maintaining the containers of fish in an inverted position during approximately the first half of their travel through the atmosphere of hot air, turning the containers of fish to an upright position while in the atmosphere of hot air, advancing the containers of fish in an upright position during the remainder of their travel through the atmosphere of hot air, and conducting the containers of fish out of said hot air atmosphere.

15. A method of cooking fish packed in open containers and constrained in the containers by a grill type carrier which comprises the steps of passing the containers of fish in an inverted position through an atmosphere of steam, advancing the containers of fish from the steam atmosphere into a confined atmosphere of hot air, continuously recirculating the confined atmosphere of hot air, maintaining the containers of fish in an inverted position during approximately the first half of their travel through the atmosphere of hot air, returning the containers of fish to an upright position while in the atmosphere of hot air, advancing the containers of fish in an upright position during the remainder of their travel through the atmosphere of hot air, and conducting the containers of fish out of said hot air atmosphere.

16. A method of cooking fish packed in open containers and constrained in the containers by a grill type carrier which comprises the steps of passing the containers of fish in an inverted position through an atmosphere of steam, advancing the containers of fish from the steam atmosphere into a confined atmosphere of hot air, maintaining the containers of fish in an inverted position during approximately the first half of their travel through the atmosphere of hot air, turning the containers of fish to an upright position while in the atmosphere of hot air, separating the atmosphere of hot air into two parts with the upright containers of fish being in a first part and the inverted containers of fish being in a second part, continuously recirculating the confined atmosphere of hot air into said first part and out of said second part in a direction opposite to the direction of movement of the containers of fish, and advancing the containers of fish out of said hot air atmosphere.

17. A method of cooking fish packed in open containers and constrained in the containers by a grill type carrier which comprises the steps of passing the containers of fish in an inverted position through an atmosphere of steam at 212° F., advancing the containers of fish from the steam atmosphere and into an atmosphere of hot air at a temperature of 212° F. to 220° F., maintaining the containers of fish in an inverted position during approximately the first half of their travel through the atmosphere of hot air, turning the containers of fish to an upright position while in the atmosphere of hot air, advancing the containers of fish in an upright position during the remainder of their travel through the atmosphere of hot air, and conducting the containers of fish out of said hot air atmosphere.

18. A method of cooking fish packed in open containers and constrained in the containers by a grill type carrier which comprises the steps of passing the containers of fish in an inverted position through an atmosphere of steam at 212° F., advancing the containers of fish from the steam atmosphere into a confined atmosphere of hot air, maintaining the containers of fish in an inverted position during approximately the first half of their travel through the atmosphere of hot air, turning the containers of fish to an upright position while in the atmosphere of hot air, separating the atmosphere of hot air into two parts with the upright containers of fish being in a first part and the inverted containers of fish being in a second part, heating the air to a temperature between 220° F. and 300° F., continuously recirculating the confined atmosphere of hot air into said first part and out of said second part in a direction opposite to the direction of movement of the contained fish, and advancing the containers of cooked fish out of said hot air chamber.

19. An apparatus for cooking fish adapted to be packed in open containers and constrained in the containers by grill type carriers comprising, a cooking chamber, a dehydrating chamber communicating with the cooking chamber, means for carrying the containers through said cooking chamber and a portion of said dehydrating chamber in an inverted position, means in said dehydrating chamber for overturning said containers from the inverted position to an upright position, means for carrying the containers through the remaining portion of said dehydrating chamber in an upright position, means for directing a cooking medium into said cooking chamber, and means for directing a dehydrating medium into said dehydrating chamber.

20. A method of cooking fish packed in open containers and constrained in the containers by a grill type carrier which comprises the steps of passing the containers of fish in an inverted position through a cooking medium, advancing the containers of fish from the cooking medium into and through a dehydrating medium, maintaining the containers of fish in an inverted position during approximately the first half of their travel through the dehydrating medium, turning the containers of fish to an upright position while in the dehydrating medium, advancing the containers of fish in an upright position during the remainder of their travel through the dehydrating medium, and conducting the containers of fish out of said dehydrating medium.

21. In an apparatus for cooking fish adapted to be supported in carriers having hooks projecting therefrom, the combination of a first conveying means for supporting said carriers by said hooks and movable along a predetermined path in the predetermined direction, second conveying means movable along said predetermined path, a plurality of pushers secured to and extending transversely of said second conveying means and disposed in positions to engage said carriers, an inclined carrier supporting means disposed below the path of movement of said conveying means and being inclined upwardly in the direction of movement of said conveying means from a position spaced from the carriers to a position engaging the carriers for lifting the hooks of said carriers free from said first conveying means, and means for driving both said conveying means in the same direction and at different speeds whereby the carriers are transferred from said first conveying means onto said inclined carrier support means for movement by said second conveying means in said predetermined direction.

22. In an apparatus for cooking fish adapted to be supported in carriers having carriers supporting hooks thereon, the combination of a first conveyor having a horizontal run, means on said first conveyor for engaging the carrier supporting hooks and for supporting the carriers with the containers in an inverted position, a second conveyor having a run disposed adjacent to said horizontal run of said first conveyor, a plurality of evenly spaced flight bars secured to and extending across said second conveyor, a rail inclined upwardly toward one end of said second conveyor and having a portion curved around said one end, said rail being disposed in position for engaging said carriers and for raising the same to disengage the hooks from said hook engaging means and for causing engagement of said carriers with said flight bars for advacement thereby within said curved portion of said rail to move said carriers from an inverted to an upright position on said second conveyor, means connected to said first and second conveyors for driving the same.

23. In an apparatus for cooking fish adapted to be supported in carriers having hooks projecting therefrom, the combination of a conveyor supporting said carriers and having a downwardly sloping run, a plurality of pusher bars extending transversely of said conveyor for resisting movement of said carriers downwardly when said carriers are supported on said downwardly sloping run, a downwardly sloping slideway disposed in tangent relation with respect to said downwardly sloping run of said conveyor, said slideway sloping downwardly and away from said sloping run of said conveyor for effecting a removal and gravitational discharge of said carriers from said second conveyor and from said pusher bars, and means connected to said conveyor for driving the same.

References Cited in the file of this patent

UNITED STATES PATENTS

| 847,147 | Arthur | Mar. 12, 1907 |
| 1,234,131 | Cleveland | July 24, 1917 |
| 1,609,802 | Ekstrom | Dec. 7, 1926 |
| 2,058,849 | Bergen | Oct. 27, 1936 |
| 2,060,232 | Manning et al. | Nov. 10, 1936 |
| 2,741,978 | Cheftel et al. | Apr. 17, 1956 |
| 2,909,986 | Beavois | Oct. 27, 1959 |

FOREIGN PATENTS

| 1,010,176 | France | Mar. 19, 1952 |